United States Patent
Nava et al.

[11] Patent Number: 5,998,568
[45] Date of Patent: Dec. 7, 1999

[54] POLYESTERS PREPARED FROM ALKOXYLATED INTERMEDIATES

[75] Inventors: Hildeberto Nava, Cary; Karin F. Nelson-Baron, Durham, both of N.C.

[73] Assignee: Reichhold, Inc., Research Triangle Park, N.C.

[21] Appl. No.: 09/231,192

[22] Filed: Jan. 14, 1999

[51] Int. Cl.[6] .................................................. C08G 63/02
[52] U.S. Cl. .................... 528/275; 528/89; 528/92; 528/93; 528/95; 528/272; 528/275; 528/290; 528/302; 528/303; 528/307; 528/308; 528/308.6; 528/373; 528/376; 528/391; 528/287; 525/437; 524/706; 524/709; 524/710; 524/714; 524/779
[58] Field of Search ................................ 568/41, 45, 55, 568/56, 61, 648; 528/272, 275, 290, 302, 303, 307, 308, 308.6, 373, 376, 391, 287, 89, 92, 93, 95; 529/437; 524/706, 709, 710, 714, 779

[56] References Cited

U.S. PATENT DOCUMENTS

| | | | |
|---|---|---|---|
| 3,056,827 | 10/1962 | Windholz | 260/476 |
| 3,549,692 | 12/1970 | Bockmann et al. | 260/475 |
| 3,553,167 | 1/1971 | Schnell et al. | 260/47 |
| 3,896,090 | 7/1975 | Maximovich | 260/77.5 D |
| 4,107,143 | 8/1978 | Inata et al. | 528/176 |
| 4,216,298 | 8/1980 | Schreckenberg et al. | 525/439 |
| 4,217,297 | 8/1980 | Lindner et al. | 260/463 |
| 4,261,922 | 4/1981 | Kem | 260/512 R |
| 4,283,580 | 8/1981 | Odanaka et al. | 568/858 |
| 4,297,455 | 10/1981 | Lindner et al. | 525/439 |
| 4,310,706 | 1/1982 | Strege | 568/648 |
| 4,310,707 | 1/1982 | Strege | 568/648 |
| 4,310,708 | 1/1982 | Strege et al. | 568/648 |
| 4,314,945 | 2/1982 | McMullen et al. | 260/340.2 |
| 4,341,905 | 7/1982 | Strege | 568/45 |
| 4,355,136 | 10/1982 | Dombroski et al. | 525/35 |
| 4,388,455 | 6/1983 | Bales | 528/176 |
| 4,423,205 | 12/1983 | Rajan | 528/371 |
| 4,440,937 | 4/1984 | Krimm et al. | 549/228 |
| 4,524,224 | 6/1985 | Taylor et al. | 568/858 |
| 4,556,748 | 12/1985 | Tsang et al. | 568/858 |
| 4,584,408 | 4/1986 | Wang et al. | 568/48 |

(List continued on next page.)

FOREIGN PATENT DOCUMENTS

WO 91/16292  10/1991  WIPO .

*Primary Examiner*—Samuel A. Acquah
*Attorney, Agent, or Firm*—Myers Bigel Sibley & Sajovec

[57] ABSTRACT

A method for making a polyester resin comprises reacting a first polyfunctional alcohol or polyfunctional thiol and a carbonate in the presence of a catalyst to form an alkoxylated intermediate. The catalyst comprises: (1) a metal, a salt of a metal, or mixtures thereof and (2) a quaternary ammonium salt, a tertiary amine, an imidazole, or mixtures thereof. The alkoxylated intermediate is then reacted with a polyfunctional organic acid or anhydride thereof to form the polyester resin.

16 Claims, 1 Drawing Sheet

U.S. PATENT DOCUMENTS

| | | | |
|---|---|---|---|
| 4,587,323 | 5/1986 | Toman | 528/66 |
| 4,613,678 | 9/1986 | Swart | 560/92 |
| 4,754,017 | 6/1988 | Leitz et al. | 528/371 |
| 4,758,606 | 7/1988 | Bentley et al. | 521/172 |
| 4,824,969 | 4/1989 | Austin et al. | 549/230 |
| 4,835,289 | 5/1989 | Brindopke | 549/229 |
| 4,877,886 | 10/1989 | Ream | 549/230 |
| 4,892,954 | 1/1990 | Brindopke et al. | 549/229 |
| 4,906,792 | 3/1990 | Heilmann et al. | 568/812 |
| 4,920,203 | 4/1990 | Tang et al. | 525/409 |
| 5,059,723 | 10/1991 | Dressler | 568/45 |
| 5,068,460 | 11/1991 | Sumner, Jr. et al. | 568/648 |
| 5,091,543 | 2/1992 | Grey | 549/228 |
| 5,102,976 | 4/1992 | Kressdorf et al. | 528/272 |
| 5,104,987 | 4/1992 | King | 544/401 |
| 5,157,159 | 10/1992 | Janulis et al. | 568/677 |
| 5,164,497 | 11/1992 | King et al. | 544/87 |
| 5,191,123 | 3/1993 | King | 564/507 |
| 5,210,322 | 5/1993 | King et al. | 568/579 |
| 5,218,135 | 6/1993 | Buysch et al. | 558/277 |
| 5,247,103 | 9/1993 | King et al. | 549/510 |
| 5,288,923 | 2/1994 | Fennhoff et al. | 568/640 |
| 5,304,628 | 4/1994 | Kinoshita et al. | 528/370 |
| 5,331,066 | 7/1994 | Takanoo et al. | 525/438 |
| 5,397,671 | 3/1995 | Bayley et al. | 430/109 |
| 5,407,772 | 4/1995 | Bayley et al. | 430/109 |
| 5,442,037 | 8/1995 | Lee et al. | 528/301 |
| 5,451,656 | 9/1995 | Menovcik et al. | 528/288 |
| 5,616,681 | 4/1997 | Itoh et al. | 528/279 |
| 5,679,871 | 10/1997 | Nava | 568/648 |
| 5,691,095 | 11/1997 | Shinzo et al. | 430/106 |
| 5,714,568 | 2/1998 | Nava | 528/196 |
| 5,731,380 | 3/1998 | Golder | 525/64 |
| 5,763,692 | 6/1998 | Kierkus et al. | 568/868 |

PROPOXYLATION OF 1,4 CYCLOHEXANE DIMETHANOL:

POLYESTERS PREPARED FROM ALKOXYLATED INTERMEDIATES

FIELD OF THE INVENTION

The present invention generally relates to the preparation of polyesters using carbonates.

BACKGROUND OF THE INVENTION

Polyester-based resins, such as those formed from saturated and unsaturated polyesters, are utilized in a variety of end-use applications. The resins can be used, for example, in conjunction with other types of materials to form composites such as pre-pregs. The polyesters may also be used as sheet molding compounding (SMC) resins, casting resins, ultraviolet (UV)-cured resins, pultrusion resins, powder coatings, toner resins, corrosion resistant resins, gel coats, laminating resins, filament winding, hand lay-up, and resin transfer molding.

Traditional polyester forming resins have typically involved the reaction of polyfunctional organic acids and alcohols, more particularly, dicarboxylic acids and diols. Examples of these polyester forming processes are proposed in U.S. Pat. Nos. 3,787,526; 4,588,668, and 4,933,252. These processes, however, are disadvantageous in that long reaction times are often required. Moreover, high pressure conditions are typically needed in order for the reaction to proceed to an acceptable product yield.

A possible alternative polyester forming process involves the use of organic carbonates as set forth in U.S. Pat. No. 5,714,568. Employing carbonates is potentially more desirable than using organic acids and alcohols in preparing polyesters. In particular, utilizing carbonates involves producing carbon dioxide as a by-product which is typically easily removed from the reaction medium. In contrast, a traditional reaction between an organic acid and an alcohol yields water as a by-product. This is usually undesirable since more energy is typically required to make the reaction proceed. Moreover, it is often difficult to separate the water from the reaction medium.

Notwithstanding the above, there remains a need in the art for polyester processes involving carbonates that proceed at faster reaction rates. In particular, it would be especially desirable to enhance the solubility of the carbonate in the reaction medium in order to increase the interaction between active substituents on the reactants.

In view of the above, it is an object of the invention to provide processes for preparing polyesters utilizing organic carbonates that progress at faster reaction rates relative to conventional processes.

SUMMARY OF THE INVENTION

This object and others are provided by the present invention. In one aspect, the invention relates to a method for making a polyester resin. The method comprises reacting a first polyfunctional alcohol or polyfunctional thiol and a carbonate in the presence of a catalyst to form an alkoxylated intermediate. The catalyst comprises: (1) a metal, a salt of a metal salt, or mixtures thereof and (2) a quaternary ammonium salt, a tertiary amine, an imidazole, or mixtures thereof. By using the two above components as part of a catalyst, Applicants have unexpectedly discovered a synergistic effect with respect to reaction times. The alkoxylated intermediate is then reacted with a polyfunctional organic acid or anhydride to form the polyester resin. Preferably, the alkoxylated intermediate contains a polycarbonate segment having from 1 to 20 repeating units.

The invention provides faster processes for producing polyesters that avoid many of the problems associated with convention processes employing organic acids or anhydrides thereof and alcohols. The processes of the invention are also desirable in that they may be carried out using known equipment.

DETAILED DESCRIPTION OF THE PREFERRED EMBODIMENT

Figure 1:
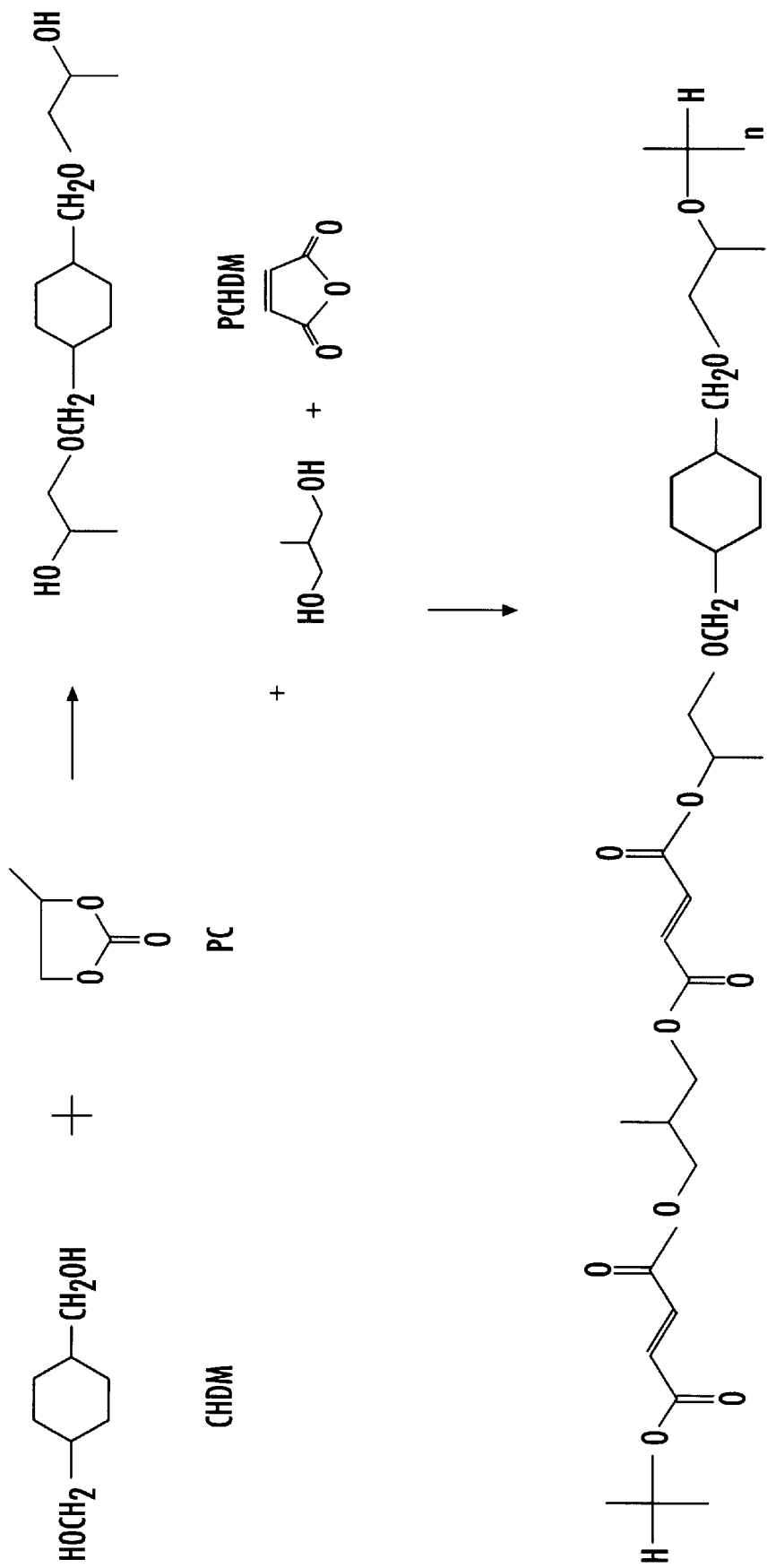
FIG. 1 is a reaction scheme for producing a polyester in accordance with the invention.

The invention will now be described in greater detail with reference to the preferred embodiments set forth herein. It should be appreciated, however, that these embodiments are only to be construed for illustrative purposes, and in no way limit the scope of the invention.

In one aspect, the invention relates to a method for making a polyester resin, which may be saturated or unsaturated. The method comprises reacting a first polyfunctional alcohol or polyfunctional thiol and a carbonate in the presence of a catalyst to form an alkoxylated intermediate. The catalyst comprises: (1) a metal, a salt of a metal, or mixtures thereof and (2) a quaternary ammonium salt, a tertiary amine, an imidazole, or mixtures thereof. The alkoxylated intermediate is then reacted with a polyfunctional organic acid or anhydride to form the polyester resin. Preferably, the alkoxylated intermediate contains a polycarbonate segment having from 1 to 20 repeating units.

For the purposes of the invention, the term "polyfunctional alcohol or polyfunctional thiol" can encompass a number of alcohols such as diols, triols, and the like, along with thiols, all of which have a functionality greater than 1. The polyfunctional alcohol or thiol typically does not contain an aromatic group (e.g., non-phenolic and the thiol is non-thiophenolic). Moreover, the polyfunctional alcohol or thiol may be non-halogenated. Examples of polyfunctional alcohols and polyfunctional thiols are expressed by the following formulas:

HO---[R]$_{\overline{n}}$—OH

HO—R----[R$_1$]$_{\overline{n}}$—R---OH

HO—CH$_2$---[R$_1$]$_{\overline{n}}$—CH$_2$—OH

HO—CH$_2$—R----[R$_1$]$_{\overline{n}}$—R—CH$_2$—OH

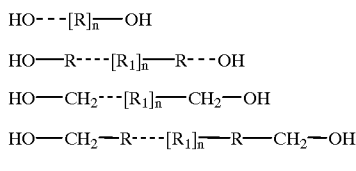

HS----[R]$_{\overline{n}}$—SH

HS—R----[R$_1$]$_{\overline{n}}$—R---SH

HS—CH$_2$---[R$_1$]$_{\overline{n}}$—CH$_2$—SH  and

HS—CH$_2$—R----[R$_1$]$_{\overline{n}}$—R—CH$_2$—SH

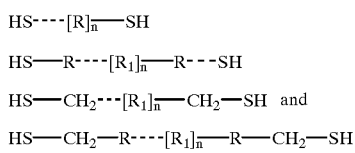

wherein (1) R is an aliphatic or cycloaliphatic group containing $C_1$ to $C_{40}$ linear or branched, α, β-unsaturated straight or branched alkenyl or alkynyl. R may contain a group selected from $C_1$–$C_{20}$, halogen, $OR_2$, $SR_3$, $OP(=O)R_3$, $OP(=O)(OR_3)_2$, $OP(=O)OR_3$, $O—N(R_3)_2$, and $S—C(=S)N(R_3)_2$; wherein $R_2$ is an alkyl containing from 1 to 20 carbon atoms in which each of the hydrogen atoms may be independently replaced by a halide. $R_3$ is aryl, or a straight-chained or branched $C_1$ to $C_{20}$ alkyl group, or wherein the two $R_3$ groups (when present) may be joined to form a 5- to 6-membered heterocyclic ring;

(2) $R_1$ is an aliphatic, cycloaliphatic, or aromatic group containing $C_1$ to $C_{40}$ linear or branched, α, β-unsaturated straight or branched alkenyl or alkynyl. $R_1$ may contain a group selected from $C_1$–$C_{20}$, halogen, $OR_2$, $SR_3$, $OP(=O)R_3$, $OP(=O)(OR_3)_2$, $OP(=O)OR_3$, $O$—$N(R_3)_2$, and $S$—$C(=S)N(R_3)_2$, wherein $R_2$ is an alkyl from 1 to 20 carbon atoms in which each of the hydrogen atoms may be independently replaced by a halide, $R_3$ is aryl, or a straight-chained or branched $C_1$ to $C_{20}$ alkyl group, or wherein the two $R_3$ groups (when present) may be joined to form a 5- to 6-membered heterocyclic ring, and wherein $R_1$ may be linked to R by O, S, $C(=O)$, or $S(=O)_2$; and (3) wherein n may be from 0 to 20 repeating units.

Examples of polyfunctional alcohols are set forth in U.S. Pat. No. 5,714,568, the disclosure of which is incorporated herein by reference in its entirety. The polyfunctional alcohols and polyfunctional thiols which are typically employed are non-phenolic, namely are aliphatic and cycloaliphatic. Particularly preferred first polyfunctional alcohols are represented by the formulas:

The first polyfunctional alcohol or polyfunctional thiol may be present in various amounts, preferably from about 30 to about 60 percent based on the weight of the reactive components (e.g., carbonate and first polyfunctional alcohol or polyfunctional thiol) and more preferably from about 30 to about 40 percent.

A number of carbonates may be used in the method of the invention, including those described in U.S. Pat. Nos. 5,714,568 and 2,987,555, the disclosures of which are incorporated herein by reference in their entirety. In general, suitable organic carbonate compounds may include any cyclic alkylene carbonate having the appropriate carbonate moiety attached at adjacent positions capable of undergoing hydroxyalkylation with compounds containing active hydrogens, namely the polyfunctional alcohols and polyfunctional thiols. Particularly suitable cyclic organic carbonates are of the general formula:

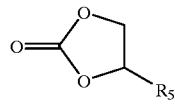

where $R_5$ is selected from the group consisting of H, $C_1$–$C_{18}$ alkyl, $C_1$–$C_{20}$ alkoxy, alkoxyalkylene, (poly)alkoxyalkylene, and aryl. Specific examples of cyclic organic carbonates include, but are not limited to, propylene carbonate, 1,2- and 2,3-butylene carbonate, phenylethylene carbonate, and glycerol carbonate. Mixtures of any of the above compounds may be employed.

The process of the invention may be carried out using various molar ratios of carbonate compound to the first polyfunctional alcohol or polyfunctional thiol which is to be alkoxylated. Preferably, the carbonate may be added in an amount ranging from about 1.0 to about 1.5 moles per mole of active hydrogen in the first polyfunctional alcohol or polyfunctional thiol, and more preferably from about 1.0 to about 1.05 mole per mole of active hydrogen.

In accordance with the invention, the method is carried out in the presence of catalyst comprising: (1) a metal, a salt of a metal, or mixtures thereof and (2) a quaternary ammonium salt, a tertiary amine, an imidazole, or mixtures thereof. Preferably, an quaternary alkyl ammonium halide salt is employed. The above catalyst is preferably a mixture of the two types of components (1) and (2) listed above.

The metals which may be used are to be selected from a broad range of compounds and alloys thereof known to one skilled in the art. Examples of metals include, but are not limited to, those in Group IA, Group IIA, Group IIB (including lanthanides and actinides), Group IVB, Group VB, Group VIB, Group VIIB, Group VIII, Group IB, Group IIB, Group IIIA, Group IVA, Group VA, and Group IIIB. The metal may be utilized in substantially pure form. For the purposes of the invention, the metal being present in "substantially pure form" relates to a metal existing as an uncombined chemical element.

A salt of a metal may also be employed and is to include any number of salts that may form with metals. Examples of salts include, but are not limited to, alcohol-derived salts, phenoxy salts, organic acid salts, hydroxides, halogen-containing salts, and alkoxides, particularly those of lithium, sodium, potassium, tin, and antimony. The metal salts which may be used include, for example, halogenated (e.g., chlorine, bromine, iodine, and fluoride), hydroxide, and alkoxide salts, especially those of lithium, sodium, potassium, tin, and antimony. Especially suitable salts are alcohol-derived salts such as, for example, methoxide and ethoxide salts.

Various quaternary ammonium salts may be employed in the catalyst and include, but are not limited to, alkyl ammonium halides such as quaternary salts (e.g., tetramethylammonium chloride, and tetramethyl-ammonium bromide), as well as other ammonium halides (e.g., benzyltrimethylammonium chloride, benzyltrimethylammonium bromide, benzyltributylammonium chloride, and benzyltrimethylammonium bromide). Other salts which may be employed include, but are not limited to, tetramethylammonium hydroxide, tetramethylammonium hydrogen sulfate, benzyltrimethylammonium hydrogen sulfate, benzyltributylammonium hydrogen sulfate, 1,4-diazabicyclo[2,2,2]octane, diazabicyclo[4,3,0]-nonene-(5), 2-methyl imidazol, piperidine, morpholine, triethyl amine, tributyl amine, and the like.

Tertiary amines (e.g., triethyl amine and tributyl amine) and imidazoles (e.g., imidazole, 2-methylimidazole, N-(2'-hydroxyethyl)-2-methylimidazole, piperidine, morpholine, and triethylamine) may also be employed. Mixtures of the above may be used.

The metal salt and the amine may be used in various amounts. The catalyst preferably comprises from about 0.0005 to about 4 percent of the metal, the salt of the metal, or the mixture thereof based on the weight of the reactive components, and from about 0.005 to about 5 weight percent of the quaternary ammonium salt, the tertiary amine, the imidazole, or mixtures thereof. More preferably, the catalyst comprises from about 0.005 to about 3 percent of the metal, the salt of the metal, or the mixture thereof, and from about 0.05 to about 3 weight percent of the quaternary ammonium salt, the tertiary amine, the imidazole, or mixtures thereof. The above weight percentages are based on the weight of the reactive components as defined hereinabove.

The catalyst may also include other components such as those described in U.S. Pat. Nos. 4,310,706; 4,310,707; 4,341,905; 5,068,460; and 5,059,723, the disclosures of which are incorporated herein by reference in their entirety.

Phosphorous-containing compounds may also be employed and include, for example, those described by the formulas:

$(R_4)_3P; (R_4)_4PY$ wherein $R_4$ is an aliphatic, cycloaliphatic, or aromatic group containing a group ranging from $C_4$ to $C_{20}$ which may be linear or branched; and Y is a group selected from a halogen (e.g., chlorine, bromine, fluorine, or iodine); an acetate; or a bicarbonate. Specific examples of the above compounds include, but are not limited to, triphenyl phosphate, tributyl phosphine, tributylphosphonium acetate, tributylphosphonium bromide, tributylphosphonium chloride, tributylphosphnium fluoride, tributylphosphonium iodide, tetraphenylphosphonium chloride, tetraphenylphosphonium bromide, tetraphenylphosphonium acetate, and phosphine salts. Mixtures of the above may also be employed.

The catalyst may be used in various amounts. Preferably, the catalyst is present in an amount ranging from about 0.0005 to about 4 percent by weight based on the total weight of the reacting components. More preferably, the catalyst amount is from about 0.005 to about 3 percent by weight.

The step involving the reaction of a first polyfunctional alcohol or thiol with a carbonate may be carried out in the presence of an inert non-aqueous organic solvent if so desired. The inert solvent is inert in the sense that it does not contain active hydrogens. Examples of inert organic solvents includes, but are not limited to, toluene, xylene, cyclohexane, tetrahydronaphthalene, naphthalene, anisole, chlorobenzethere, and mixtures thereof. It should be appreciated that employment of the inert solvent is optional.

The process of the invention may be carried out using any known and suitable vessel to contain the reactants and the products made therefrom. Preferably, the materials forming the vessel are inert with respect to the conditions of the process. Suitable materials include, but are not limited to, glass, stainless steel, and the like.

The process of the invention may be carried out under a variety of processing conditions with respect to temperature, pressure, and time. As an example, the step involving the alkoxylation reaction of the first polyfunctional alcohol or thiol with the carbonate may be carried out at a temperature preferably ranging from about 100° C. to about 250° C., more preferably from about 130° C. to about 200° C. Although Applicants do not wish to be bound by any theory, it is believed that the rate of the alkoxylation reaction of the first polyfunctional alcohol or thiol with the carbonate may be temperature dependent. The reaction vessel may be heated by employing conventional means known to one skilled in the art such as, but not limited to, a heat lamp, a heating mantle, an oil bath, and the like.

The reaction time for the first polyfunctional alcohol or thiol and the carbonate may depend on other factors such as, for example, catalyst type, and the type of polyfunctional organic compound having active hydrogens and carbonate. Generally, the time which is sufficient for the alkoxylation reaction to take place is the time at which carbon dioxide is no longer generated during the reaction process. The time for the reaction preferably ranges from about 2 hours to about 24 hours.

The alkoxylated intermediates that are formed as a result of the invention may be represented by various formulas known to one skilled in the art. For the purposes of the invention, the term "alkoxylated intermediate" refers to a reaction product between a polyfunctional alcohol or polyfunctional thiol and a carbonate. The alkoxylated intermediate preferably has 2 or more hydroxyl groups. For example, the alkoxylated intermediate may be represented by the formula:

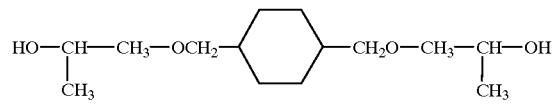

The alkoxylated intermediates formed in accordance with the invention may be used alone or in combination with various polyfunctional alcohols or polyfunctional thiols which are appropriate in polyester-forming reactions. The alcohols, include, but are not limited to, ethylene glycol, propylene glycol, diethylene glycol, neopentyl glycol, dipropylene glycol, poly-tetramethylene glycol, 1,5-pentanediol, 1,4-butanediol, 2-methyl propanediol, 1,6-hexanediol, hydrogenated bisphenol A; 1,4-cyclohexanediol, 1,4-cyclohexanedimethanol, sorbitol, 1,2,3,6-hexatetrol, 1,4-sorbitol, pentaerythritol, dipentaerythritol, tripentaerythritol, sucrose, 1,2,4-butanetriol, 1,2,5-pentanetriol, glycerol, 2-methyl propanetriol, 2-methyl 1,2,4-butanetriol, trimethylol ethane, trimethylol propane, and 1,3,5-trihydroxyethyl benzene. Mixtures of any of the above may be used. Hydroxyalkyl phenols may also be employed and they may be contained as hydroxyethyl or hydroxypropyl intermediates where the degree of ethoxylation or propxylation may be from 1 to 20 repeating units. Examples of useful polyhydric phenols, which, in these examples, are hydroxyalkoxylated, include, but are not limited to, catechol, resorcinol, hydroquinone, 4,4'-biphenol, 4,4'-isopropylidene bis(o-cresol), and 4,4'-isopropylidene bis(2-phenyl phenol). Alkylene diphenols such as, but not limited to, bisphenol A, pyrogallol, and phloroglucinol may be used. Mixtures of any of the above may be employed if so desired.

The alcohols and the hydroxyalkyl derivatives of phenols may be is used in various amounts, preferably from about 35 to about 65 percent based on the total weight of the glycols contained in the resulting polyester.

As set forth herein, the process of the invention may also include reacting the alkoxylated intermediate with at least one compound that may be a monofunctional organic acid, a polyfunctional organic acid or anhydride thereof, or mixtures of the above to form the polyester resin which may be saturated or unsaturated. Any known and suitable polyester resins may be formed via the process of the invention including, but not limited to, branched and linear polyesters of varying molecular weights. The components (e.g., acids, anhydrides, alcohols, and hydroxyalkyl derivatives of alcohols and phenols) which are suitable for forming various polyesters are well known to the skilled artisan.

Any of the appropriate monofunctional organic acids may be used in forming the polyester resin. These compounds include, but are not limited to, acrylic acid, methacrylic acid, crotonic acid, cinnamic acid, sorbic acid, and benzoic acid. Mixtures of the above may be used. Preferably, the monofunctional organic acid is employed in an amount ranging from about 1 to about 20 percent based on the total amount of acid or anhydride compounds.

The polyfunctional organic acid or anhydrides thereof which are used in the preparation of the polyesters are numerous and known compounds. Suitable polyfunctional acids or anhydrides thereof include, but are not limited to, maleic acid, fumaric acid, citraconic acid, itaconic acid, glutaconic acid, phthalic acid, isophthalic acid, terephthalic acid, trimellitic acid, pyromellitic acid, cyclohexane dicarboxylic acid, succinic acid, adipic acid, azelaic acid, malonic acid, alkenyl succinic acids, such as dodecenylsuccinic acid, dodecylsuccinic acid, octadecenylsuccinic acid, and anhydrides thereof. Lower alkyl esters of any of the above may also be employed. Mixtures of the above are also suitable.

The polyester resin may be combined with known and suitable monomeric components to form a liquid resin such as a laminating resin or a gel coat resin for coating on a suitable substrate. The substrate may be part of an article of manufacture such as, but not limited to, a marine vessel, a vehicle, or an aircraft.

Vinyl monomers that may be used in forming the liquid resin, for example, styrene and styrene derivatives such as, alpha-methyl styrene, para methyl styrene, isopropyl styrene, divinyl benzene, and the like, along with alkyl acrylates and methacrylates, as well as their polyfunctional intermediates such as those described in U.S. Pat. No. 4,916,023, the disclosure of which is incorporated herein by reference in its entirety.

Moreover, the polyester may be combined with other materials such as waxes, fillers, reinforcements (e.g., glass fibers and carbon fibers), pigments, peroxides and accelerators, to obtain mixtures that can be used to form a molded part or a shaped article.

These compositions may be used in a variety of end use applications such as, for example, sheet molding compounding (SMC) resins, castings resins, UV cured resins, pultrusion resins, powder coatings, toner resins, corrosion resistant resins, low styrene content resins, gel coats, filament winding, hand lay-up, resin transfer molding, and prepregs.

An exemplary reaction scheme employed in forming the alkoxylated intermediates and polyesters in accordance with the invention is presented in FIG. 1.

The following examples are set forth to illustrate the invention, and are not to be construed as limiting the invention defined by the claims.

EXAMPLES

Preparation of Polyester Resins

The following examples illustrate the syntheses of various polyester resins in accordance with the invention.

EXAMPLES 1–4

Examples 1–4 were made in a reactor equipped with a suitable condenser and heating mantle. The reactor was charged with hydrogenated bisphenol A, ethylene carbonate, 0.1% triphenylphosphine and.0.1% Doverphos S-680 (distearyl pentaerythritol diphosphate) sold by Dover Chemical in the amounts listed in Table 1. The reaction was performed between 180° C. and 200° C. and the formation of the derivative was followed by infrared spectrum and $CO_2$ evolution. The resulting hydroxylated alcohol intermediates were mixed with anhydrides and glycols in molar ratios as listed in Table 1. The mixture also contained 0.1% Doverphos S-680, and inhibitors such as hydroquinone. The reaction was performed between 200° C. and 220° C. until a low acid number was obtained. The results of the physical testing are presented in Table 3.

EXAMPLES 5–6

Examples 5 and 6 were made in a reactor equipped with a suitable condenser and heating mantle. The reactor was charged with hydrogenated bis-phenol A, ethylene carbonate, 0.05% sodium methoxide and 0.1% Doverphos S-680, in the amounts listed in Table 2. The reaction was performed between 180° C. and 200° C. and the formation of the derivative was followed by infrared spectrum and $CO_2$ evolution. The resulting hydroxylated alcohol intermediates were mixed with anhydrides and glycols in molar ratios as listed in Table 2. The mixture also contained 0.1% Doverphos S-680, and inhibitors such as hydroquinone monomethylether. The reaction was performed between 200° C. and 220° C. until a low acid number was obtained. The results of the physical testing are presented in Table 3.

EXAMPLES 7–10

Examples 7 through 10 were made in a reactor equipped with a suitable condenser and heating mantle. The reactor was charged with 1,4 cyclohexane dimethanol, propylene carbonate, 0.05% sodium methoxide, 0.1% Doverphos S-680, and in the case of Example 10, 0.1% tetramethylammonium chloride. These amounts are listed in Table 4. The reaction was performed between 180° C. and 200° C. and the formation of the derivative was followed by infrared spectrum and $CO_2$ evolution. The resulting hydroxylated alcohol intermediates were mixed with acids, anhydrides and glycols in molar ratios as listed in Table 4. The mixture also contained 0.1% Doverphos S-680, and inhibitors such as hydroquinone monomethylether. The reaction was performed between 200° C. and 220° C. until a low acid number was obtained. The results of the physical testing are presented in Table 6.

EXAMPLES 11–13

Examples 11 through 13 were made in a reactor equipped with a suitable condenser and heating mantle. The reactor was charged with 1,4 cyclohexane dimethanol, propylene carbonate, 0.03% potassium hydroxide, 0.1% Doverphos S-680, and in the case of Example 11, 0.1% tetramethylammonium chloride. These amounts are listed in Table 5. The reaction was performed between 180° C. and 200° C. and the formation of the derivative was followed by infrared spectrum and $CO_2$ evolution. The resulting hydroxylated alcohol intermediates were mixed with acids, anhydrides and glycols in molar ratios as listed in Table 5. The mixture also contained 0.1% Doverphos S-680, and inhibitors such as hydroquinone monomethylether. The reaction was performed between 200° C. and 220° C. until a low acid number was obtained. The results of physical testing are presented in Table 6.

EXAMPLES 14–15

Examples 14 and 15 were made in a reactor equipped with a suitable condenser and heating mantle. The reactor was charged with neopentyl glycol, propylene carbonate, 0.05% sodium methoxide, 0.1% Doverphos S-680, and in the case of example 11, 0.1% tetramethylammonium chloride. These amounts are listed in Table 7. The reaction was performed between 180° C. and 200° C. and the formation of the derivative was followed by infrared spectrum and $CO_2$ evolution. The resulting hydroxylated alcohol intermediates were mixed with acids, anhydrides and glycols in molar ratios as listed in Table 7. The mixture also contained 0.1% Doverphos S-680, and inhibitors such as hydroquinone monomethylether. The reaction was performed between 200° C. and 220° C. until a low acid number was obtained. The results of the physical testing are presented in Table 9.

EXAMPLES 16–17

Examples 16 and 17 were made in a reactor equipped with a suitable condenser and heating mantle. The reactor was charged with neopentyl glycol, propylene carbonate, 0.03% potassium hydroxide, 0.1% Doverphos S-680, and in the case of Example 17, 0.1% tetramethylammonium chloride. These amounts are listed in Table 8. The reaction was performed between 180° C. and 200° C. and the formation of the derivative was followed by infrared spectrum and $CO_2$ evolution. The resulting hydroxylated alcohol intermediates were mixed with acids, anhydrides and glycols in molar ratios as listed in Table 8. The mixture also contained 0.1% Doverphos S-680, and inhibitors such as hydroquinone monomethylether. The reaction was performed between 200° C. and 220° C. until a low acid number was obtained. The results of the physical testing are presented in Table 9.

In the specification, there have been disclosed preferred embodiments of the invention. These embodiments are only meant to illustrate the invention. The scope of the invention is defined by the claims that follow.

TABLE 1

| Raw Materials | EXAMPLES | | | |
|---|---|---|---|---|
| | 1 | 2 | 3 | 4 |
| Hydrogenated Bisphenol-A (wt. %) | 38.76 | 39.66 | 33.93 | 34.61 |
| Ethylene carbonate (wt. %) | 14.21 | 14.53 | 24.87 | 25.37 |
| 2 methyl-1,3 propanediol (wt. %) | n/a | 14.88 | n/a | 12.99 |
| Neopentyl glycol (wt. %) | 16.80 | n/a | 14.71 | n/a |
| Maleic anhydride (wt. %) | 30.05 | 30.75 | 26.31 | 26.84 |
| Triphenylphosphine (wt. %) | 0.053 | 0.054 | 0.059 | 0.060 |
| Hydroquinone (wt. %) | 0.023 | 0.023 | 0.021 | 0.020 |
| Doverphos S-680 (wt. %) | 0.106 | 0.108 | 0.118 | 0.120 |
| Styrene (wt. %) | 40 | 39 | 40.4 | 40 |
| Viscosity, cps. RVT #4 @20 rpm | 740 | 790 | 490 | 640 |
| Mn (GPC) | 1,290 | 1,240 | 1,120 | 1,440 |
| Acid number | 12.4 | 12.4 | 10.5 | 8.6 |

TABLE 2

| Raw Materials | EXAMPLES | |
|---|---|---|
| | 5 | 6 |
| Hydrogentated Bisphenol-A (wt. %) | 34.62 | 34.62 |
| Ethylene carbonate (wt. %) | 25.38 | 25.38 |

TABLE 2-continued

| Raw Materials | EXAMPLES | |
|---|---|---|
| | 5 | 6 |
| 2 methyl- 1,3 propanediol (wt. %) | 12.99 | 12.99 |
| Maleic anhydride (wt. %) | 26.84 | 26.84 |
| Sodium methoxide (wt. %) | 0.029 | 0.029 |
| Hydroquinone monomethylether (wt. %) | 0.020 | 0.020 |
| Doverphos S-680 (wt. %) | 0.120 | 0.120 |
| Styrene (wt. %) | 36.3 | 37.5 |
| Viscosity, cps. RVT #2 @20 rpm | 800 | 875 |
| Mn (GPC) | 1,680 | 1,580 |
| Acid number | 11.8 | 12 |

TABLE 3

| Property | EXAMPLES | | | | | |
|---|---|---|---|---|---|---|
| | 1 | 2 | 3 | 4 | 5 | 6 |
| Barcol | 39–43 | 36–39 | 36–37 | 36–38 | 40–44 | 40–44 |
| HDT (° C.) | 125 | 115 | 103 | 107 | 130 | 130 |
| Flex. Strength (psi.) | 13,298 | 13,282 | 13,713 | 14,802 | 14,317 | 14,317 |
| Flex. Modulus (psiX$10^5$) | 5.05 | 5.08 | 4.98 | 4.82 | 4.58 | 4.58 |
| Ten. Strength (psi.) | 7,802 | 8,166 | 7,972 | 9,478 | 8,293 | 8,293 |
| Ten. Modulus (psi.X$10^5$) | 4.79 | 4.73 | 4.67 | 4.52 | 4.53 | 4.53 |
| % Elongation | 1.87 | 2.03 | 2.05 | 2.76 | 2.30 | 2.30 |

TABLE 4

| Raw Materials | EXAMPLES | | | |
|---|---|---|---|---|
| | 7 | 8 | 9 | 10 |
| 1,4 Cyclohexane dimethanol (wt. %) | 23.04 | 23.04 | 19.77 | 32.92 |
| Propylene carbonate (wt. %) | 32.63 | 32.63 | 27.99 | 46.62 |
| 2 methyl-1,3 propanediol (wt. %) | 14.41 | 14.41 | 12.37 | n/a |
| Maleic anhydride (wt. %) | 29.78 | 29.78 | 5.11 | 20.16 |
| Isophthalic acid (wt. %) | n/a | n/a | 34.64 | n/a |
| Sodium methoxide (wt. %) | 0.014 | 0.014 | 0.024 | 0.040 |
| Tetramethylammonium chloride (wt. %) | n/a | n/a | n/a | 0.080 |
| Doverphos S-680 (wt. %) | 0.111 | 0.111 | 0.095 | 0.159 |
| Hydroquinone monomethylether (wt. %) | 0.004 | 0.004 | 0.006 | 0.015 |
| Styrene (wt. %) | 39 | 37 | 36.3 | 41 |
| Viscosity, cps. RVT #2 @20 rpm | 1,650 | 720 | 1,010 | 520 |
| Mn (GPC) | 2,800 | 1,690 | 1,500 | 2,120 |
| Acid number | 11.8 | 16.3 | 11.8 | 10.7 |

TABLE 5

| Raw Materials | EXAMPLES | | |
|---|---|---|---|
| | 11 | 12 | 13 |
| 1,4 Cyclohexane dimethanol (wt. %) | 22.54 | 21.44 | 31.84 |
| Propylene carbonate (wt. %) | 31.88 | 30.36 | 45.08 |
| Neopentyl glycol (wt. %) | 16.28 | 15.49 | n/a |
| Maleic anhydride (wt. %) | 29.12 | 20.81 | 14.59 |
| Isophthalic acid (wt. %) | n/a | 11.77 | 8.316 |
| Potassium hydroxide | 0.016 | 0.016 | 0.023 |

TABLE 5-continued

| Raw Materials | EXAMPLES | | |
|---|---|---|---|
| | 11 | 12 | 13 |
| Tetramethylammonium chloride (wt. %) | 0.055 | n/a | n/a |
| Doverphos S-680 (wt. %) | 0.109 | 0.104 | 0.154 |
| Hydroquinone monomethylether (wt. %) | 0.005 | 0.007 | 0.004 |
| Styrene (wt. %) | 37 | 35.6 | |
| Viscosity, cps. | 700 | 2000* | |
| RVT #2 @20 rpm | | *RVT #4 | |
| Mn (GPC) | 1,950 | | |
| Acid number | 9.2 | 12.5 | 13 |

TABLE 6

| Property | EXAMPLES | | | | | |
|---|---|---|---|---|---|---|
| | 8 | 9 | 10 | 11 | 12 | 13 |
| Barcol | 42–44 | 22–30 | 35–40 | | | |
| HDT (° C.) | 122 | 39 | 83 | | | |
| Flex. Strength (psi.) | 12,631 | 8,821 | 15,239 | | | |
| Flex. Modulus (psi.X10$^5$) | 4.35 | 2.97 | 4.02 | | | |
| Ten. Strength (psi.) | 7,221 | 6,184 | 9,460 | | | |
| Ten. Modulus (psi.X10$^5$) | 4.23 | 3.67 | 4.02 | | | |
| % Elongation | 2.14 | 3.37 | 4.33 | | | |

TABLE 7

| Raw Materials | EXAMPLES | |
|---|---|---|
| | 14 | 15 |
| Neopentyl glycol (wt. %) | 17.79 | 26.20 |
| Propylene carbonate (wt. %) | 34.86 | 51.32 |
| 2 methyl-1,3 propanediol (wt. %) | 15.40 | N/a |
| Maleic anhydride (wt. %) | 31.82 | 22.19 |
| Sodium methoxide (wt. %) | 0.013 | 0.039 |
| Tetramethylammonium chloride (wt. %) | N/a | 0.077 |
| Doverphos S-680 (wt. %) | 0.105 | 0.155 |
| Hydroquinone monomethylether (wt. %) | 0.005 | 0.015 |
| Styrene (wt. %) | 37 | 43 |
| Viscosity, cps. | 4,320* | 270 |
| RVT #2 @20 rpm. | *RVT #4 | |
| Mn (GPC) | 4,650 | 1,800 |
| Acid number | 11.6 | 15.7 |

TABLE 8

| Raw Materials | EXAMPLES | |
|---|---|---|
| | 16 | 17 |
| Neopentyl glycol (wt. %) | 17.37 | 17.37 |
| Propylene carbonate (wt. %) | 34.05 | 34.05 |
| Neopentyl gylcol (wt. %) | 17.37 | 17.37 |
| Maleic anhydride (wt. %) | 31.08 | 31.08 |
| Potassium hydroxide (wt. %) | 0.016 | 0.016 |
| Tetramethylammonium chloride (wt. %) | n/a | 0.052 |
| Doverphos S-680 (wt. %) | 0.103 | 0.103 |
| Hydroquinone monomethylether (wt. %) | 0.007 | 0.007 |
| Styrene (wt. %) | 37 | 37.3 |
| Viscosity, cps. | 1,708 | 1,240 |
| RVT #2 @20 rpm. | | |
| Mn (GPC) | | |
| Acid number | 13 | 8.2 |

TABLE 9

| Property | EXAMPLES | | | |
|---|---|---|---|---|
| | 14 | 15 | 16 | 17 |
| Barcol | 43–46 | 38–43 | | |
| HDT (° C.) | 130 | 132 | | |
| Flex. Strength (psi.) | 12,056 | 12,586 | | |
| Flex. Modulus (psi.X10$^5$) | 4.41 | 4.29 | | |
| Ten. Strength (psi.) | 6,941 | 8,001 | | |
| Ten. Modulus (psi.X10$^5$) | 4.44 | 4.22 | | |
| % Elongation | 1.98 | 2.76 | | |

That which is claimed:

1. A method for making a polyester resin, said method comprising:

reacting a first polyfunctional alcohol or polyfunctional thiol and a carbonate in the presence of a catalyst to form an alkoxylated intermediate, the catalyst comprising: (1) a first component selected from the group consisting of a metal, a salt of a metal, and mixtures thereof and (2) a second component selected from the group consisting of a quaternary ammonium salt, a tertiary amine, an imidazole, and mixtures thereof; and reacting the alkoxylated intermediate with a polyfunctional organic acid or anhydride thereof to form the polyester resin.

2. The method according to claim 1, wherein component (1) is an alkali metal salt and component (2) is a quaternary ammonium salt selected from the group consisting of, tetramethylammonium hydroxide, tetramethylammonium chloride, and mixtures thereof.

3. The method according to claim 1, wherein said first polyfunctional alcohol or polyfunctional thiol is selected from the group consisting of:

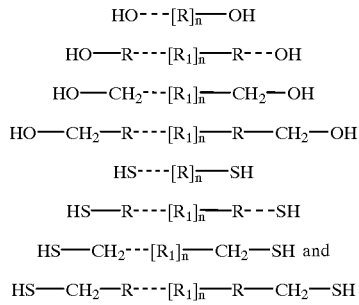

wherein:

R and $R_1$ are independently selected from an aliphatic or cycloaliphatic group, wherein said aliphatic or cycloaliphatic group contains a substituent selected from the group consisting of an alkenyl and an alkynyl, wherein said alkenyl or alkynyl is $C_1$ to $C_{40}$ linear or branched, or an α,β-unsaturated straight or branched substituent; and n ranges from 1 to 20.

4. The method according to claim 1, wherein said first polyfunctional alcohol or polyfunctional thiol is a non-halogenated alcohol.

5. The method according to claim 1, wherein said carbonate is selected from the group consisting of propylene carbonate, 1,2-butylene carbonate, 2,3-butylene carbonate, phenylethyl carbonate, glycerol carbonate, and mixtures thereof.

6. The method according to claim 1, wherein said catalyst further comprises a phosphorous-containing compound.

7. The method according to claim 1, wherein said step of reacting the alkoxylated intermediate with a polyfunctional organic acid or anhydride thereof to form the polyester resin further comprises reacting the alkoxylated intermediate in the presence of a monofunctional organic acid.

8. The method according to claim 1, wherein said step of reacting the alkoxylated intermediate with a polyfunctional organic acid or anhydride thereof to form the polyester resin further comprises reacting the alkoxylated intermediate in the presence of a second polyfunctional alcohol or polyfunctional thiol.

9. A method for making a polyester resin, said method comprising:

reacting a first polyfunctional alcohol or polyfunctional thiol and a carbonate in the presence of a catalyst to form an alkoxylated intermediate containing a polycarbonate segment having from 1 to 20 repeating units, the catalyst comprising: (1) a first component selected from the group consisting of a metal, a salt of a metal, and mixtures thereof and (2) a second component selected from the group consisting of a quaternary ammonium salt, a tertiary amine, an imidazole, and mixtures thereof; and reacting the alkoxylated intermediate with a polyfunctional organic acid or anhydride thereof to form the polyester resin.

10. The method according to claim 9, wherein component (1) is an alkali metal salt and component (2) is a quaternary ammonium salt selected from the group consisting of tetramethylammonium chloride, tetramethyl-ammonium hydroxide, tetramethylammonium chloride, and mixtures thereof.

11. The method according to claim 9, wherein said first polyfunctional alcohol or polyfunctional thiol is selected from the group consisting of HO---[R]$_\overline{n}$---OH HO—R----[R$_1$]$_\overline{n}$—R---OH HO—CH$_2$---[R$_1$]$_\overline{n}$—CH$_2$—OH -continued HO—CH$_2$—R----[R$_1$]$_\overline{n}$—R—CH$_2$—OH HS----[R]$_\overline{n}$—SH HS—R----[R$_1$]$_\overline{n}$—R---SH HS—CH$_2$---[R$_1$]$_\overline{n}$—CH$_2$—SH and HS—CH$_2$—R----[R$_1$]$_\overline{n}$—R—CH$_2$—SH wherein:

R and R$_1$ are independently selected from an aliphatic or cycloaliphatic group, wherein said aliphatic or cycloaliphatic group contains a substituent selected from the group consisting of an alkenyl and an alkynyl, wherein said alkenyl or alkynyl is C$_1$ to C$_{40}$ linear or branched, or an α,β-unsaturated straight or branched substituent; and n ranges from 1 to 20.

12. The method according to claim 9, wherein said first polyfunctional alcohol is a non-halogenated alcohol.

13. The method according to claim 9, wherein said carbonate is selected from the group consisting of propylene carbonate, 1,2-butylene carbonate, 2,3-butylene carbonate, phenylethyl carbonate, glycerol carbonate, and mixtures thereof.

14. The method according to claim 9, wherein said catalyst further comprises a phosphorous-containing compound.

15. The method according to claim 9, wherein said step of reacting the alkoxylated intermediate with a polyfunctional organic acid or anhydride thereof to form the polyester resin further comprises reacting the alkoxylated intermediate in the presence of a monofunctional organic acid.

16. The method according to claim 9, wherein said step of reacting the alkoxylated intermediate with a polyfunctional organic acid or anhydride thereof to form the polyester resin further comprises reacting the alkoxylated intermediate in the presence of a second polyfunctional alcohol or polyfunctional thiol.

* * * * *